US007051279B2

(12) United States Patent
Simonyi

(10) Patent No.: US 7,051,279 B2
(45) Date of Patent: May 23, 2006

(54) METHOD AND SYSTEM FOR PROVIDING MULTIPLE LEVELS OF HELP INFORMATION FOR A COMPUTER PROGRAM

(75) Inventor: Charles Simonyi, Medina, WA (US)

(73) Assignee: Intentional Software Corporation, Bellevue, WA (US)

( * ) Notice: Subject to any disclaimer, the term of this patent is extended or adjusted under 35 U.S.C. 154(b) by 37 days.

(21) Appl. No.: 10/616,293

(22) Filed: Jul. 8, 2003

(65) Prior Publication Data
US 2005/0010906 A1 Jan. 13, 2005

(51) Int. Cl.
*G06F 3/00* (2006.01)
(52) U.S. Cl. .................. 715/705; 717/105; 717/125
(58) Field of Classification Search ................ 715/705, 715/713, 709; 717/106, 101, 108, 123, 144, 717/157
See application file for complete search history.

(56) References Cited

U.S. PATENT DOCUMENTS

| 5,845,120 | A  * | 12/1998 | Reddy et al. ............... 717/125 |
| 6,199,061 | B1   | 3/2001  | Blewett et al. |
| 6,275,227 | B1 * | 8/2001  | DeStefano ............... 369/30.01 |
| 6,339,436 | B1   | 1/2002  | Amro et al. |
| 6,467,081 | B1 * | 10/2002 | Vaidyanathan et al. ..... 717/123 |
| 6,502,233 | B1 * | 12/2002 | Vaidyanathan et al. ..... 717/101 |
| 6,574,792 | B1 * | 6/2003  | Easton ....................... 717/142 |
| 6,690,390 | B1 * | 2/2004  | Walters et al. .............. 715/705 |
| 6,857,103 | B1 * | 2/2005  | Wason ........................ 715/709 |
| 2002/0091990 | A1 * | 7/2002 | Little et al. .................. 717/105 |
| 2004/0061714 | A1 * | 4/2004 | Sinclair et al. ............. 345/705 |
| 2004/0255234 | A1 * | 12/2004 | Methot ....................... 715/500 |
| 2005/0138559 | A1 * | 6/2005 | Santos-Gomez et al. .... 715/709 |

OTHER PUBLICATIONS www.borland.com, "Using Jbuilder's IDE", 2005, http://info.borlan.com/techpubs/jbuilder/jbuilderx/introjb/envap-pbrowser.html pp. 1-24.*
www.g2meyer.com, "Usable Help: a gallery of onscreen help", 2003, pp. 1-18.*
www.doc-o-matic.com, "Doc-o-Matic, Screen Shots", Feb. 2002, http://web.archive.org/web/20020201190524/doc-o-matic.com/screenshots.html pp. 1-5.*

(Continued)

*Primary Examiner*—Ba Huynh
*Assistant Examiner*—Steven Theriault
(74) *Attorney, Agent, or Firm*—Perkins Coie LLP

(57) ABSTRACT

A method and system for providing help information for a computer program. The help system provides help information based on a schema that specifies the structure of a valid computer program. The schema provides definitions of program element types that are specific instances of a program element type derived from more general program element types. The help system identifies a "derivation" of program element types relating to the selected program element. The help system then displays the derivation to the user. The user can then select to display documentation associated with the displayed program element types.

36 Claims, 6 Drawing Sheets

OTHER PUBLICATIONS

Clarke, Craig et al., "A helping hand", Dec. 2002, http://web.archive.org/web/20021201080954/www.dnjonline.com/articlaes/tools/may02/, pp 1-4.*

Gaines. B. R. et al. "A display oriented programmer's assistant" Mar. 1979 International Journal of Man-Machine Studies pp 157-187.*

MSDN Training Offerings, Microsoft Development Environment (1 page) http://www.codeproject.com/dotnet/VSP [Accessed May 27, 2003].

Project4—Microsoft Visual C++ [design] (1 page) http://www.codeproject.com/dotnet/VSP [Accessed May 27, 2003].

Project3—Microsoft Visual C++ [design] (1 page) http://www.codeproject.com/dotnet/VSP [Accessed May 27, 2003].

Project3.Form1 (1 page) http://www.codeproject.com/dotnet/VSP [Accessed May 27, 2003].

Project6—Microsoft Visual C++ [design] (1 page) http://www.codeproject.com/dotnet/VSP [Accessed May 27, 2003].

New Project (1 page) http://www.codeproject.com/dotnet/VSP [Accessed May 27, 2003].

Visual Studio.NET Screen Snots (7 pages) http://www.codeproject.com/dotnet/vspr. [Accessed May 27, 2003].

* cited by examiner

METHOD AND SYSTEM FOR PROVIDING MULTIPLE LEVELS OF HELP INFORMATION FOR A COMPUTER PROGRAM

TECHNICAL FIELD

The described technology relates generally to providing help information for a computer program.

BACKGROUND

Computer programs are generally written in a high-level programming language (e.g., Java or C). Compilers are then used to translate the instructions of the high-level programming language into machine instructions that can be executed by a computer. The compilation process is generally divided into six phases:

1. Lexical analysis
2. Syntactic analysis
3. Semantic analysis
4. Intermediate code generation
5. Code optimization
6. Final code generation During lexical analysis, the source code of the computer program is scanned and components or tokens of the high-level language are identified. The compiler then converts the source code into a series of tokens that can be processed during syntactic analysis. For example, during lexical analysis, the compiler would identify the statement cTable=1.0;

as the variable (cTable), the operator (=), the constant (1.0), and a semicolon. A variable, operator, constant, and semicolon are tokens of the high-level language.

During syntactic analysis (also referred to as "parsing"), the compiler processes the tokens and generates a syntax tree to represent the program based on the syntax (also referred to as "grammar") of the programming language. A syntax tree is a tree structure in which operators are represented by non-leaf nodes and their operands are represented by child nodes. In the above example, the operator (=) has two operands: the variable (cTable) and the constant (1.0). The terms "parse tree" and "syntax tree" are used interchangeably in this description to refer to the syntax-based tree generated as a result of syntactic analysis. For example, such a tree optionally may describe the derivation of the syntactic structure of the computer program (e.g., it may describe that a certain token is an identifier, which is an expression as defined by the syntax). Syntax-based trees may also be referred to as "concrete syntax trees" when the derivation of the syntactic structure is included, and as "abstract syntax trees" when the derivation is not included.

During semantic analysis, the compiler modifies the syntax tree to ensure semantic correctness. For example, if the variable (cTable) is an integer and the constant (1.0) is a floating-point, then during semantic analysis a floating point to integer conversion would be added to the syntax tree.

During intermediate code generation, code optimization, and final code generation, the compiler generates machine instructions to implement the program represented by the syntax tree. A computer can then execute the machine instructions.

A system has been described for generating and maintaining a computer program represented as an intentional program tree, which is a type of syntax tree. (For example, U.S. Pat. No. 5,790,863 entitled "Method and System for Generating and Displaying a Computer Program" and U.S. Pat. No. 6,097,888 entitled "Method and System for Reducing an Intentional Program Tree Represented by High-Level Computational Constructs," both of which are hereby incorporated by reference.) The system provides a mechanism for directly manipulating nodes corresponding to "program elements" by adding, deleting, and moving the nodes within an intentional program tree. An intentional program tree is one type of "program tree." A "program tree" is a tree representation of a computer program that includes operator nodes and operand nodes representing program elements. A program tree may also include inter-node references (i.e., graph structures linking nodes in the tree), such as a reference from a declaration node of an identifier to the node that defines that identifier's program element type. An abstract syntax tree and a concrete syntax tree are examples of a program tree. Once a program tree is generated, the system performs the steps of semantic analysis, intermediate code generation, code optimization, and final code generation to the transformation of the computer program represented by the program tree into executable code.

FIG. 1 is a diagram illustrating a portion of a program tree corresponding to the definition of a method. The method is defined by the following:

public static int increment (int i){i++; return i;}

Node 101 corresponds to the root of the sub-tree of the program tree representing the "increment" method. Nodes 102–108 are child nodes of the root node. Nodes 109 and 110 are child nodes of node 106, node 111 is a child node of node 107, and node 112 is a child node of node 108. Each node has a reference to another node in the program tree that defines the node type. For example, node 107 references a declaration node that defines a "statement," and node 111 references (indicated by the dashed line) node 106 for the parameter "i." Such referenced nodes are also referred to as declaration definitions.

Various editing facilities provide a "context-sensitive help" capability for a computer program. The information used to provide the help may be associated with the nodes of a program tree as comments, remarks, summaries, help information, to-do items, or other documentation. Such documentation may be stored as an attribute of a node. A programmer may specify such documentation for various nodes of a program tree during program development. When a programmer selects a node, an editing facility may display a list of help topics that are appropriate for the selected node (i.e., the editing facility is context-sensitive). For example, if the selected node represents a Java method call, then the editing facility may display an indication of programmer-specified remarks and an indication of system-defined documentation for a Java method call as help topics. The programmer-specified remarks may describe why the Java method is being called, and the system-defined remarks may describe the syntax and semantics of a Java method call semantics. When the programmer selects a help topic, the editing facility displays the associated documentation.

Although the editing facilities provide context-sensitive help, the help information may not include all the information that a programmer may need. For example, the help information associated with Java method call type may describe the details of the Java syntax of a method call. A programmer may, however, need more general information, such as what is an object-oriented method call or what is a function call. It would be desirable to have a help system that

DETAILED DESCRIPTION

Figure 1:
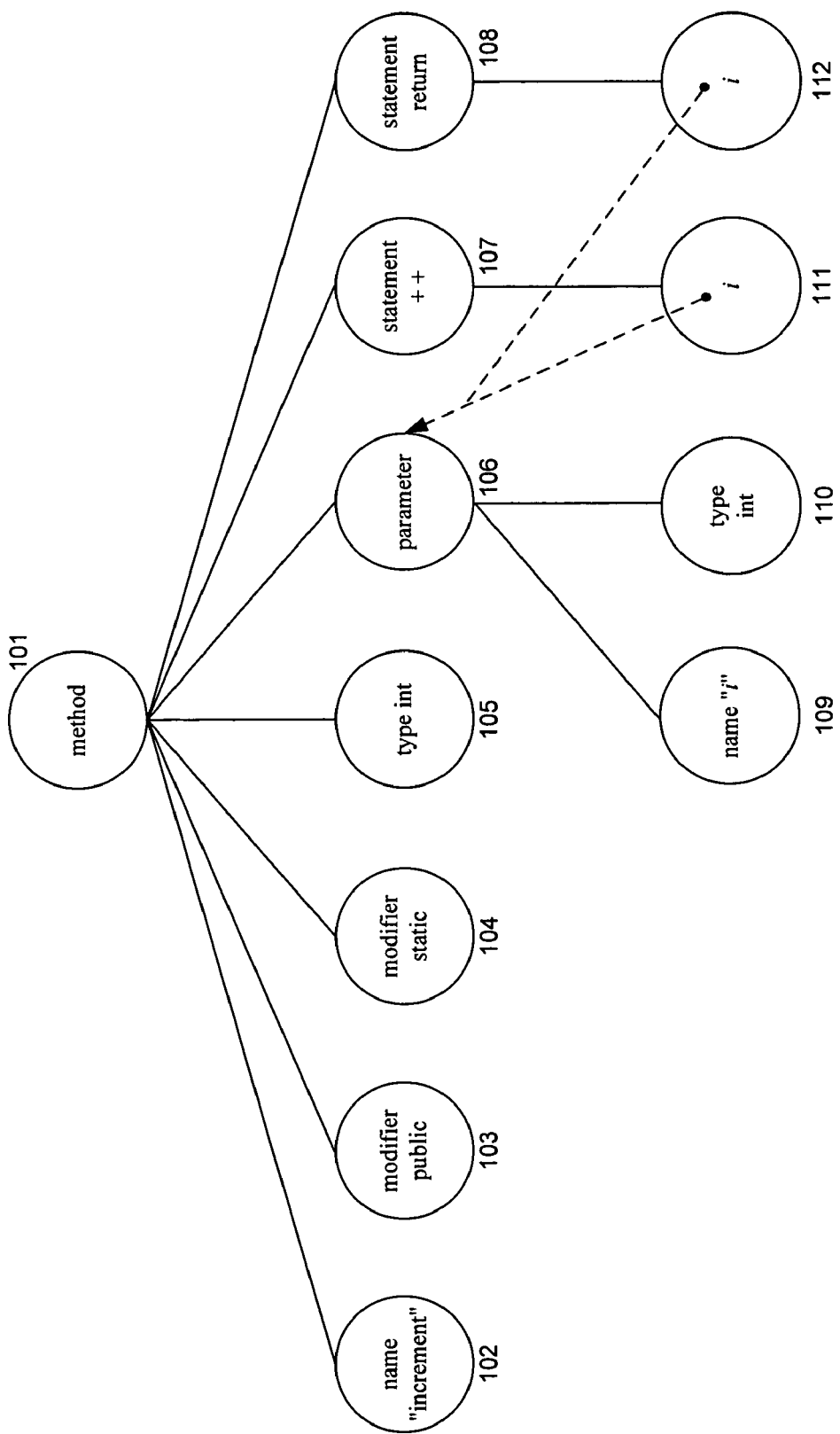
FIG. 1 is a diagram illustrating a portion of a program tree corresponding to the definition of a method.

A method and system for providing help information for a computer program is provided. In one embodiment, the help system provides help information based on a schema that specifies the structure of a valid computer program. The schema provides definitions of program element types that are specific instances of a program element type derived from more general program element types. For example, a program element type may be "a Java method call," which is a specific instance of the more general program element type "object-oriented method call." The program element types have associated help information that may be system-defined or user-defined. The help system provides help information for a computer program that is defined by program elements having a program element type. For example, a statement that is a call to a method may have the program element type of "a Java method call." The help system receives from the user a selection of a program element of the computer program for which help information is desired. The help system identifies a "program element type derivation" of program element types relating to the selected program element. A "program element type derivation" is a list of increasingly more general program element types that define the current type. For example, the derivation of a method call program element would include the "Java method call" and "object-oriented method call" program element types. The help system then displays the derivation to the user. When the user selects a program element type from the displayed derivation, the help system retrieves the help information associated with the selected program element type. The help system then displays the retrieved help information to the user. In this way, a user can select help information relating to a program element at various levels of generalization.

In one embodiment, a computer program is represented as a program tree, and the program element types are defined via "is a" relationships between nodes. The program element types may be predefined in a schema or defined as part of the computer program. For example, a "Java method call" may be a predefined program element type, and the declaration of a certain variable in the computer program may be a user-defined program element type. Thus, nodes within the program tree may have is a relationships with nodes representing the computer program or with nodes within schemas. The is a relationships define an ancestor-and-descendent relationship in that the "Java method call" program element type is a descendent of an "object-oriented method call" program element type, and the "object-oriented method call" program element type is an ancestor of the "Java method call" program element type. Each ancestor program element type may represent an increasing level of generalization or abstraction of program element types. These increasing levels of generalization define a chain of program element types (i.e., a derivation).

In an alternate embodiment, the help system provides help information associated with other types of derivations and derivations for related program elements. A derivation can be based on a programmatic relationship, which may include a derivation based on the organization of the computer program, referred to as a "program tree derivation." For example, a statement within a method may have a derivation that includes the class definition in which the method is defined, the module that contains the class definition, and the project that contains the module. This derivation may be defined by the hierarchical relationship among the operators and operands of a program tree. The related program elements include ancestor program elements, sibling program elements, and descendant program elements. For example, the related program elements of an actual parameter of a method invocation may be the other parameters of the method invocation and the method invocation itself. In such a case, the help system may provide help information related to the actual parameter, the other parameters, and the method invocation program tree elements. The help information may be provided for the program elements themselves and help associated with their program element type derivations and program tree derivations. As another example of a derivation, program trees may represent different levels of abstraction of a computer program. The levels of abstraction may include a design-level specification of the behavior of a computer program (e.g., a design document) and an instruction set specific level of the computer program. Each program tree represents a more concrete representation of the next higher level of abstraction. The program elements for a program tree at one level of abstraction may reference their corresponding program elements of the program tree at the next higher level of abstraction. These levels of abstraction are referred to as "program tree abstraction derivations." For example, a program tree that defines the structure of a user interface may specify a dialog box at one level of abstraction that is defined as list box and then a drop-down list box at lower levels of abstraction. The program element for drop-down list box may have a child program element that specifies the font for the choices within the drop-down list box. When the help system provides help information for the drop-down list box program element, it may provide help information associated with the font specified by the child program element and with the program element type derivation that may include information describing a font generally. The help system may also provide help information associated with the program tree derivation (e.g., list box and dialog box) of the drop-down list box.

Figure 2:
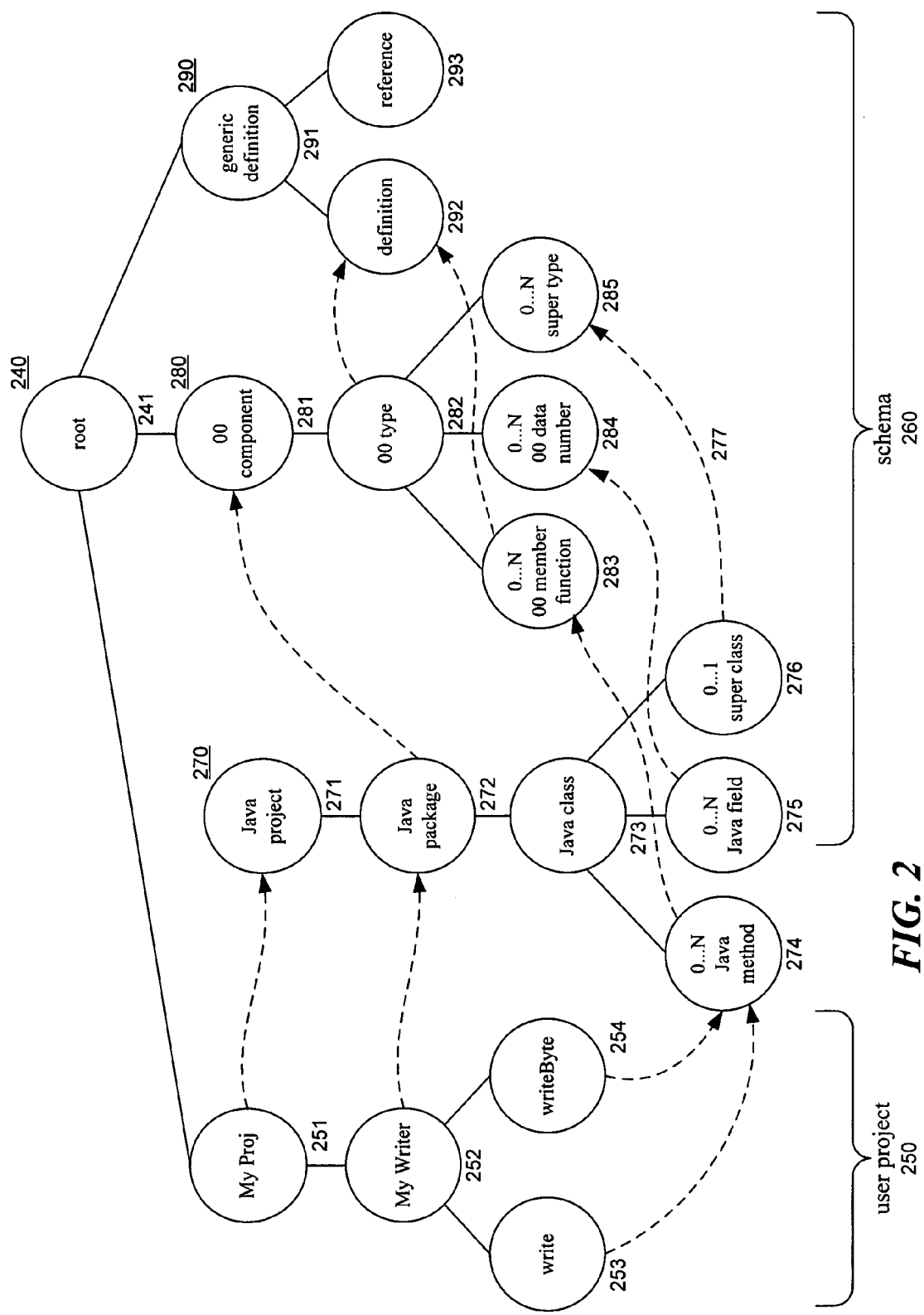
FIG. 2 is a diagram illustrating a portion of a program tree that shows a sample user project and sample schemas in one embodiment.

FIG. 2 is a diagram illustrating a portion of a program tree 240 that shows a sample user project and sample schemas in one embodiment. The program tree 240 includes a user project or program subtree 250 and schema subtrees 260. The schema subtrees include subtrees 270, 280, and 290, which may be a standard part of each program tree that represents a Java computer program. The root of the program tree is represented by node 241. The user project subtree 250 includes nodes 251–254, which represent program elements for a portion of the following code:

```
class MyWriter {
    void write(byte i) {
        writeByte(i);
    }
    void writeByte(int i) { ... }
    ...
}
```

Schema subtree 290 specifies the structure of a valid program tree that may be common to any programming language. Schema subtree 280 specifies the structure of a valid program tree that may be common to any object-oriented programming language. Schema subtree 270 specifies the structure of a valid program tree for the Java programming language. For example, node 282 specifies that a program tree representing a computer program in an object-oriented programming language can have a node that is a node type or program element type of "OO." In addition, nodes 283, 284, and 285 indicate that a node with a node type or program element type of "OO" can have child nodes with node types of "OO member function," "OO data member," and "OO supertype," respectively. Each child node also may specify the number of occurrences of a node of that node type that is allowed in a valid program tree. For example, "0 . . . N" means that there may be zero or more occurrences, "0 . . . 1" means that there may be zero or one occurrence, "1" means that there must be only one occurrence, etc. The child nodes in one embodiment may represent the possible categories of a node of the parent node type. For example, a node of node type "Java class" in a program tree can have child nodes with the categories of "Java method," "Java field," or "superclass," as indicated by nodes 274, 275, and 276. Each node of a program tree may have its node type defined by a reference to a node within a schema. For example, user program nodes 252, 253, and 254 reference schema nodes 272, 274, and 274, respectively. Each schema represents a certain level of abstraction defining a valid computer program. In this example, schema subtree 290 represents an abstraction of schema subtree 280, which in turn represents an abstraction of schema subtree 270. Each node of a schema subtree may have a reference to the corresponding node in the next higher level of abstraction. For example, node 276 (corresponding to a "superclass" node type for the Java programming language) has a reference to node 285 (corresponding to the "supertype" node type for an object-oriented programming language), as indicated by the dashed line 277. Each node may represent a structure containing information (e.g., documentation or help information) relating to the node type of the node. The references between nodes represented by the dashed lines are referred to as "isa" relationships. Each is a relationship may be considered to extend the structure of the referenced node. For example, node 276 (with a node type of "superclass") has an is a relationship with node 285 (with a node type of "supertype"). Node 285 may have documentation that describes the "supertype" node type generically, while node 276 may have documentation that describes the Java "superclass" node type specifically, effectively extending the documentation of node 285.

Figure 3:
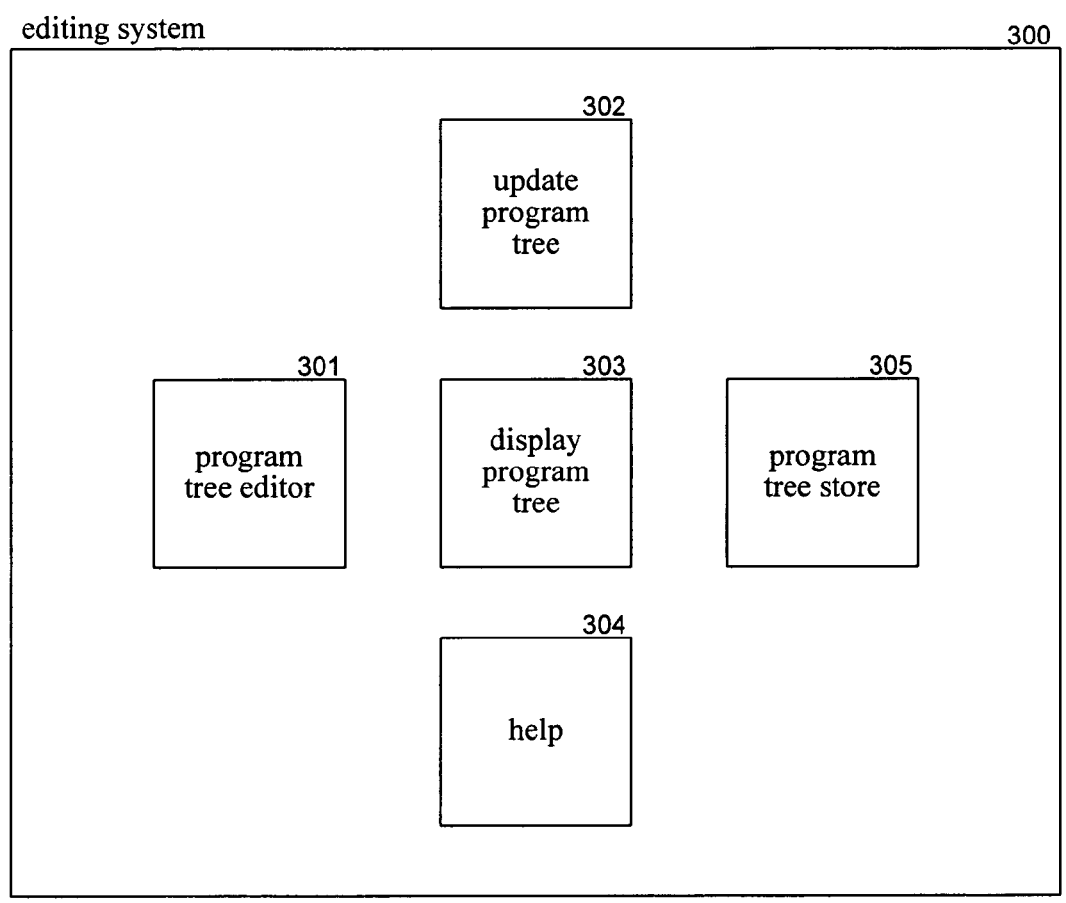
FIG. 3 is a block diagram illustrating components of the editing system in one embodiment.

FIG. 3 is a block diagram illustrating components of an editing system 300 in one embodiment. The editing system 300 may include a program tree editor 301, an update program tree component 302, a display program tree component 303, and a help component 304. The program tree editor invokes the update program tree component when the programmer has indicated to make a modification (e.g., add a node) to the program tree. The program tree editor invokes the display program tree component to update the display of the program tree. The system also includes a program tree store 305. The program tree store contains the program tree, including the schemas currently being modified by the program tree editor. The help component is invoked when a user has selected a program element and has requested help. The help component generates and displays the derivation for the selected program element. When a programmer selects a program element type from the displayed derivation, the help component displays help information associated with the selected program element type.

The help system may be implemented on a computer system that includes a central processing unit, memory, input devices (e.g., keyboard and pointing devices), output devices (e.g., display devices), and storage devices (e.g., disk drives). The memory and storage devices are computer-readable media that may contain instructions that implement the help system. In addition, the data structures and message structures may be stored or transmitted via a data transmission medium such as a signal on a communications link. Various communications links may be used, such as the Internet, a local area network, a wide area network, or a point-to-point dial-up connection.

Figure 4:
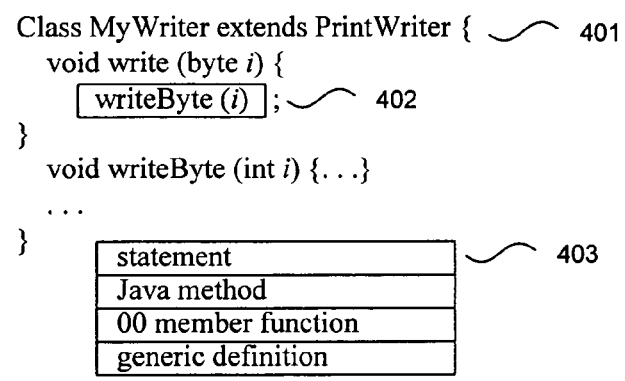
FIG. 4 is a display page that illustrates the display of a derivation relating to a selected program element in one embodiment.

FIG. 4 is a display page that illustrates the display of a derivation for a selected program element in one embodiment. The display page 400 includes a display representation 401 of a portion of a program tree representing the MyWriter class 252 (see FIG. 2). In this example, the programmer has selected the name of the writeByte method 402 in the call statement within the definition of the write method. The programmer then indicated to display help information associated with the selected method. In response, the help system identified the program element type derivation of the writeByte method definition. The writeByte method definition corresponds to node 254 of the program tree (FIG. 2). Referring back to FIG. 2, although the subtree representing the statement is not shown, it has a node corresponding to the name "writeByte" that has an is a relationship with node 254. Node 254 has an is a relationship with the "Java method" program element type represented by node 274. Node 274 has an is a relationship with the "OO member function" program element type represented by node 283. Node 283 has an is a relationship with the "definition" program element type represented by node 292. Thus, the derivation for the selected program element includes node 254, node 274, and node 283. Returning to FIG. 4, the help system may generate a display list 403 by retrieving a name attribute associated with each node in the derivation. When the programmer selects a name from the display list, the help system retrieves the documentation or other help information associated with the corresponding node. For example, if the programmer selects the "Java method" program element type from the display list, then the system retrieves documentation associated with node 274 (FIG. 2), which may be stored as an attribute of the node, and displays it to the programmer. The "statement" in the display list corresponds to the selected program element and is, strictly speaking, not considered part of the derivation. When the programmer selects the "statement" from the display list, the help system displays user-defined help information that is associated with the selected program element. Alternatively, rather than displaying the display list, the help system can retrieve the documentation from each node in the list and display it.

Figure 5:
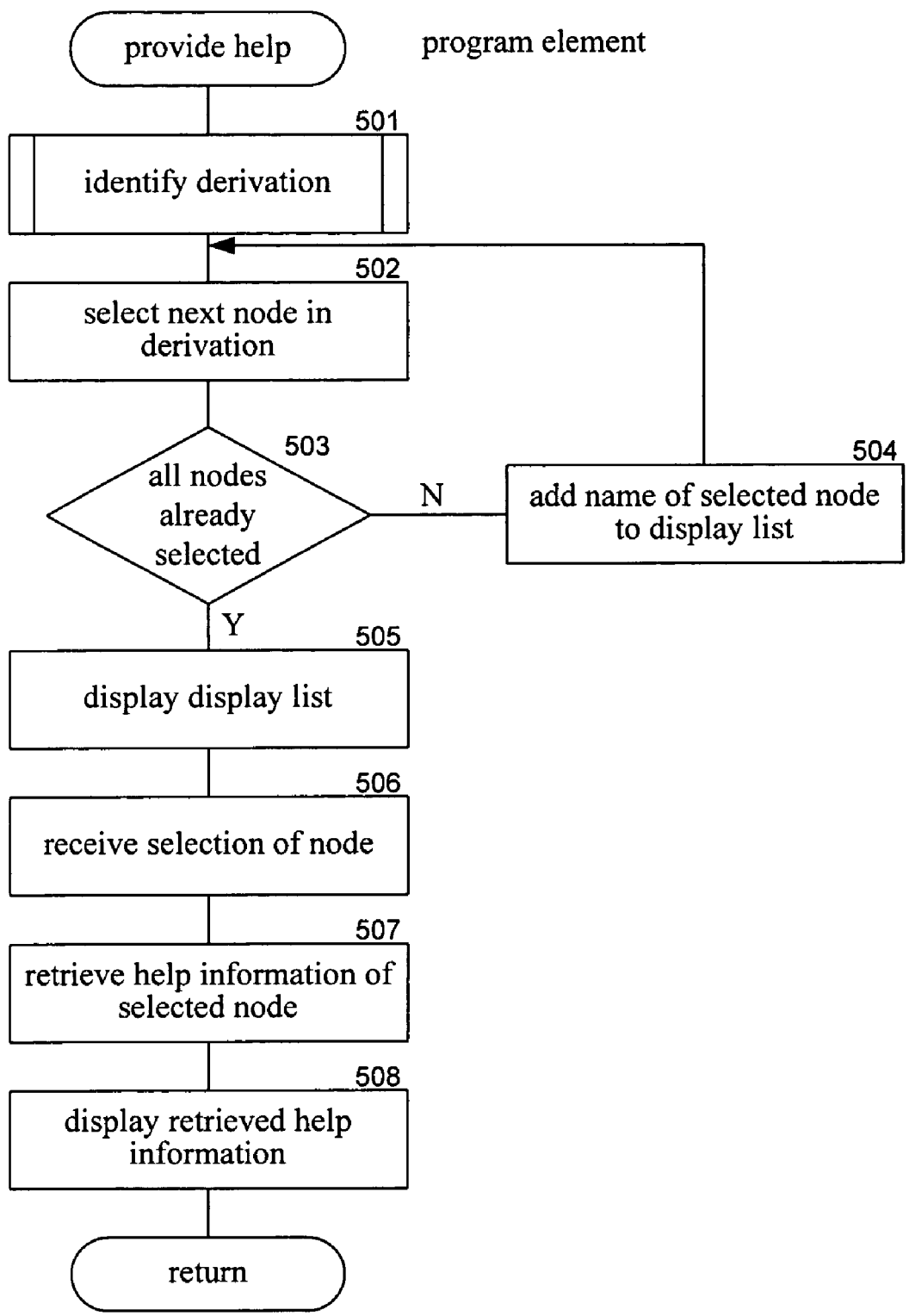
FIG. 5 is a flow diagram illustrating the processing of the help component in one embodiment.

FIG. 5 is a flow diagram illustrating the processing of the help component in one embodiment. The component is passed an indication of the currently selected program element and displays a list containing the program element type derivation of the selected program element and help information when the programmer selects an entry (e.g., program element type) from the display list. In block 501, the component invokes the identify derivation component to identify the derivation of the passed program element. In blocks 502–504, the component loops, identifying the ancestor nodes of the passed program element. The component may also add an entry to the display list corresponding to the passed program element. One skilled in the art will appreciate that entries corresponding to other program elements may be added to the display list. For example, entries corresponding to the parent node or sibling nodes of the passed program element within the program tree may be added to the display list. In block 502, the component selects the next node in the derivation. In decision block 503, if all the nodes in the derivation have already been selected, then the component continues at block 505, else of the component continues at block 504. In block 504, the component adds the name of the selected node to the display list and loops to block 502 to select the next node in the derivation. In block 505, the component displays the display list to the programmer. In block 506, the component receives a selection of a program element type from the displayed list. In block 507, the component retrieves help information associated with the selected program element type. In block 508, the component displays the retrieved help information and then returns.

Figure 6:
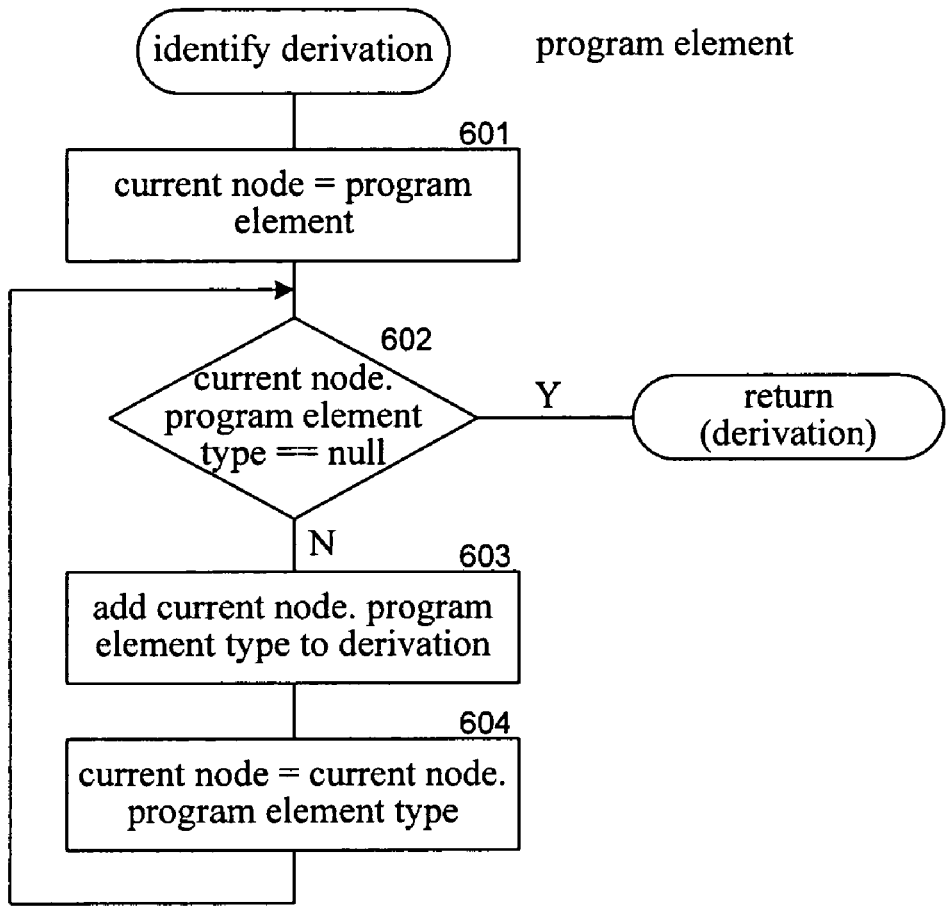
FIG. 6 is a flow diagram illustrating the processing of the identify derivation component in one embodiment.

FIG. 6 is a flow diagram illustrating the processing of the identify derivation component in one embodiment. The component is passed a program element and returns the program element type derivation for that program element. In block 601, the component sets the current node to the passed program element. In blocks 602–604, the component loops, selecting each ancestor node of the passed program element and adding it to the derivation. In decision block 602, if the program element type of the current node is null, the component is at the end of the derivation and returns, else the component continues at block 603. In block 603, the component adds the program element type of the current node to the derivation. In block 604, the component sets the current node to the program element type of the current node and then loops to block 602 to determine whether the end of the derivation has been reached.

One skilled in the art will appreciate that although specific embodiments of the help system have been described herein for purposes of illustration, various modifications may be made without deviating from the spirit and scope of the invention. For example, one skilled in the art could adapt the described help system to provide help information for the derivation of any type of programmatic relationship and for any type of related program elements. The related program elements can be defined on a program element type basis. For example, the related program elements to an actual parameter could be the other actual parameter (i.e., sibling program elements) and to a method could be its enclosing class (i.e., program element). Accordingly, the invention is defined by the appended claims.

I claim:

1. A method in a computer system for providing help information for a computer program, the method comprising:

providing a hierarchy of program element types, each program element type having associated help information;

providing a program tree representation of the computer program, the program tree having program elements, each program element having a program element type;

receiving from a user an indication to provide help information for a selected program element;

identifying ancestor program element types of the selected program element;

displaying to the user an indication of each identified ancestor program element type; and upon receiving a selection of a displayed ancestor program element type, displaying to the user help information associated with the selected ancestor program element type.

2. The method of claim 1 wherein the displaying to the user of an indication of each ancestor program element type includes displaying naming information associated with a program element type.

3. The method of claim 1 wherein the help information associated with a program element type is stored as an attribute of a node representing the program element type.

4. The method of claim 1 wherein program element types are stored in schemas defining valid program trees at different levels of abstraction.

5. The method of claim 4 wherein a schema is represented as a tree data structure.

6. The method of claim 4 wherein each program element type is represented as a node within a tree.

7. The method of claim 1 wherein the ancestor program element types are specified by isa relationships, starting at the selected program element.

8. The method of claim 1 wherein an ancestor program element type includes a program element type defined in the program tree.

9. A method for providing help information for a computer program, the method comprising:

providing a specification of program element types, a program element type being defined as a specific instance derived from a more general program element type, program element types having associated help information;

providing a computer program with program elements, each program element having a program element type;

receiving from a user an indication to provide help information for a selected program element;

identifying a derivation of program element types for the selected program element~ the derivation having multiple Droaram element types;

displaying to the user an indication of program element types in the identified derivation; and upon receiving a selection of a displayed program element type, displaying to the user help information associated with the selected program element type.

10. The method of claim 9 wherein the displaying to the user of an indication of each program element type includes displaying name information associated with a program element type.

11. The method of claim 9 wherein the help information associated with a program element type is stored as an attribute of a node representing the program element type.

12. The method of claim 9 wherein program element types are stored in schemas defining valid computer programs at different levels of abstraction.

13. The method of claim 9 wherein program element types are stored as definitions within the computer program.

14. The method of claim 9 wherein a program element type that is a specific instance of a more general program element type is defined by an is a relationship.

15. A method for providing information for a computer program, the method comprising:
providing a hierarchy of schemas defining valid computer programs, each schema specifying program element types at different levels of abstraction;
providing a computer program with program elements, each program element having a program element type;
identifying a derivation of program element types for a program element of the provided computer program from the provided hierarchy of schemas the derivation having m~titiDle proaram element types; and
displaying an indication of program element types in the identified derivation.

16. The method of claim 15 wherein the identifying of a derivation is performed in response to a user selecting a program element of the provided computer program.

17. The method of claim 15 including upon receiving a selection of a displayed program element type, displaying the information associated with the selected program element type.

18. The method of claim 15 wherein the displaying to the user of an indication of each program element type includes displaying name information associated with a program element type.

19. The method of claim 15 wherein the information associated with a program element type is stored as an attribute of the program element type.

20. The method of claim 15 wherein a program element type is stored as a definition within the computer program.

21. The method of claim 15 wherein a program element type that is a specific instance of a more abstract program element type is specified by an isa relationship.

22. A computer system for providing help information for a computer program, comprising:
a data structure storing a hierarchy of schemas defining computer programs, each schema specifying program element types of a computer program at different levels of abstraction;
a store within a computer program having program elements, each program element having a program element type;
a component that identifies a derivation of program element types for a program element of the computer program from the stored hierarchy of schemas the derivation havina rnultiple program element tvpes:
a component that displays an indication of program element types in the identified derivation; and
a component that displays help information associated with a program element type selected from the displayed indication of program element types.

23. The computer system of claim 22 wherein the identifying of a derivation is performed in response to a user selecting a program element of the computer program.

24. The computer system of claim 22 wherein the displaying to the user of an indication of program element types includes displaying name information associated with a program element type.

25. The computer system of claim 22 wherein the information associated with a program element type is stored as an aftribute of the program element type.

26. The computer system of claim 22 wherein a program element type is stored as a definition within the computer program.

27. The computer system of claim 22 wherein a program element type that is a specific instance of a more abstract program element type is specified by an is a relationship.

28. A computer-readable medium containing instructions for controlling a computer system to provide information for a computer program, by a method comprising:
providing a computer program having program elements, each program element having a program element type, the program element types being defined by a hierarchy of schemas specifying program element types at different levels of abstraction;
identifying a derivation of program element types for a program element of the provided computer program from the hierarchy of schemas, the derivation havinn multinle program element types:
displaying an indication of program element types in the identified derivation; and
displaying help information associated with a program element type selected from the displayed indication of program element types.

29. The computer-readable medium of claim 28 wherein the identifying of a derivation is performed in response to a user selecting a program element of the computer program.

30. The computer-readable medium of claim 28 wherein the information associated with a program element type is stored as an aUribute of the program element type.

31. The computer-readable medium of claim 28 wherein a program element type is stored as a definition within the computer program.

32. A method for providing help information for a computer program, the method comprising:
providing a program tree representation of the computer program, the program tree having program elements;
providing a hierarchical programmatic relationship for program elements of the program tree;
receiving from a user a selection of a program element of the program tree;
identifying a derivation of the provided hierarchical programmatic relationship for the identified program element, the derivation having mulitple program elements, each program element having a program element type;
displaying to the user the identified derivation;
receiving from user a selection of programmatic relationship of the displayed derivation;
retrieving help information associated with the selected programmatic relationship; and
displaying to the user the retrieved help information.

33. The method of claim 32 wherein the programmatic relationship is based on program trees representing the computer program with different levels of abstraction.

34. The method of claim 32 wherein the programmatic relationship is based on the hierarchy of operators and operands in the program tree.

35. The method of claim 32 wherein the programmatic relationship is based on the organization of the computer program.

36. The method of claim 32 including identifying program elements related to the selected program element wherein the displaying includes displaying help information associated with the related program elements.

* * * * *

UNITED STATES PATENT AND TRADEMARK OFFICE
CERTIFICATE OF CORRECTION

PATENT NO. : 7,051,279 B2
APPLICATION NO. : 10/616293
DATED : May 23, 2006
INVENTOR(S) : Charles Simonyi It is certified that error appears in the above-identified patent and that said Letters Patent is hereby corrected as shown below:

Column 8
Line 23, "aftribute" should be --attribute--;
Line 50, "Droaram" should be --program--;

Column 9
Line 14, "m~titiDle proaram" should be --multiple program--;
Line 48, "havina rnultiple program element types" should be --having multiple program element types--;
Line 63, "aftribute" should be --attribute--;

Column 10
Line 14, "havinn multinle" should be --having multiple--;
Line 27, "aUribute" should be --attribute--;
Line 42, "mulitple" should be --multiple--;

Signed and Sealed this

Nineteenth Day of December, 2006

JON W. DUDAS
*Director of the United States Patent and Trademark Office*